United States Patent [19]

Fayolle

[11] 4,284,757

[45] Aug. 18, 1981

[54] THERMOTROPIC AROMATIC COPOLYESTERS AND PROCESSES FOR THEIR PREPARATION

[75] Inventor: Bernard Fayolle, Ecully, France

[73] Assignee: Rhone Poulenc Industries, Paris, France

[21] Appl. No.: 124,855

[22] Filed: Feb. 26, 1980

[30] Foreign Application Priority Data

Mar. 2, 1979 [FR] France .................. 79 05920

[51] Int. Cl.³ .............................. C08G 63/64
[52] U.S. Cl. ................................ 528/191; 528/193
[58] Field of Search ............................ 528/191, 193

[56] References Cited

U.S. PATENT DOCUMENTS

| | | | |
|---|---|---|---|
| 3,169,121 | 2/1965 | Goldberg | 528/193 |
| 4,107,143 | 8/1978 | Inata et al. | 528/193 |
| 4,156,070 | 5/1979 | Jackson et al. | 528/193 |

Primary Examiner—Maurice J. Welsh
Attorney, Agent, or Firm—Stevens, Davis, Miller & Mosher

[57] ABSTRACT

A thermotropic carbonate polyester of high molecular weight which can be shaped is disclosed, characterized in that it possesses an inherent viscosity of more than 0.3 dlg$^{-1}$ (measured on a solution containing 0.5 g of polymer in 100 cm³ of a 50/5 by volume mixture of parachlorophenol and 1,2-dichloroethane) and a flow point which is above or equal to 150° C. and below 330° C., and in that it consists essentially of units of the formulae:

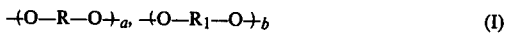

(I)

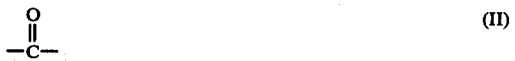

(II)

and

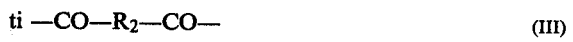

(III)

in which the radicals R, which are identical, each represent a para-phenylene radical which is monosubstituted by a methyl or ethyl group or a chlorine or bromine atom;

the radicals $R_1$ each represent an unsubstituted paraphenylene radical, with $0.3 \leq a \leq 1$, $0 \leq b \leq 0.7$ and $a+b=1$; and the radicals $R_2$, which may be identical or different, each represent a radical chosen from amongst para-phenylene, 1,4-cyclohexylene, 4,4'-biphenylene, 2,6-naphthylene, 1,1'(4,4'-ethylenedioxydiphenylene), 1,1'-(4,4'-butylenedioxydiphenylene) and 1,1'-(4,4'-hexylenedioxydiphenylene) groups, the amount of the units (II) in the mixture (II)+(III) being between 30 and 90 mol % and the molar ratio of the units (I) to the sum of units (II)+(III) being between 0.95 and 1.05.

A process for making the thermotropic carbonate polyester is also disclosed.

10 Claims, No Drawings

THERMOTROPIC AROMATIC COPOLYESTERS AND PROCESSES FOR THEIR PREPARATION

The present invention relates to thermotropic aromatic copolyesters of high molecular weight. It also relates to processes for the preparation of the said copolyesters.

It is known from French Application No. 2,270,282, published on Dec. 5, 1975, to prepare thermotropic aromatic polyesters from one or more diphenols and one or more aromatic and/or cycloaliphatic dicarboxylic acids. For economic reasons related to the high price of the raw materials, attempts have been made to replace some of these expensive diacids by compounds of the carbonate type, which are less expensive and readily accessible.

It is known from French Application No. 2,340,963, published on Sept. 9, 1977, to prepare thermotropic carbonate polyesters containing units derived from parahydroxybenzoic acids, from unsubstituted diphenols, from diaryl carbonates and, if appropriate, from aromatic dicarboxylic acids. However, it is noted that the proportion of the carbonate units is restricted (above 50 mol %, relative to the sum of the units derived from the acid products and from the carbonates, the mechanical properties of the resulting polymers become mediocre) and that the preparation of the copolyesters consequently requires the use of a high proportion of units derived from parahydroxybenzoic acids. Taking everything into account, it thus appears that these carbonate polyesters remain rather expensive.

It has been found that it is possible to obtain carbonate polyesters, which may contain a high proportion of carbonate units, from readily accessible and inexpensive products, the said carbonate polyesters possessing a set of particularly valuable characteristics. They are capable of forming anisotropic melts; they possess good mechanical properties despite the high proportion of carbonate units; and furthermore, they are easy to shape when molten, this being another surprising effect because carbonate polyesters generally possess a high viscosity in the molten state and are therefore difficult to shape.

More precisely, the present invention relates to thermotropic carbonate polyesters of high molecular weight, which can be shaped, characterized in that they possess an inherent viscosity of more than 0.3 $dlg^{-1}$ (measured on a solution containing 0.5 g of polymer in 100 $cm^3$ of a 50/50 by volume mixture of para-chlorophenol and 1,2-dichloroethane) and a flow point which is above or equal to 150° C. and below 330° C., and in that they consist or consist essentially of units of the formulae:

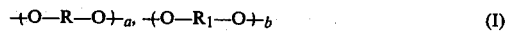  (I)

  (II)

and

—CO—$R_2$—CO—  (III)

in which the radicals R, which are identical, each represent a para-phenylene radical which is monosubstituted by a methyl or ethyl group or a chlorine or bromine atom;

the radicals $R_1$ each represent an unsubstituted paraphenylene radical, with $0.3 \leq a \leq 1, 0 \leq b \leq 0.7$ and $a+b=1$; and the radicals $R_2$, which may be identical or different, each represent a radical chosen from amongst para-phenylene, 1,4-cyclohexylene, 4,4'-biphenylene, 2,6-naphthylene, 1,1'-(4,4'-ethylenedioxydiphenylene), 1,1'-(4,4'-butylenedioxydiphenylene), and 1,1'-(4,4'-hexylenedioxydiphenylene) groups, the amount of the units (II) in the mixture (II)+(III) being between 30 and 90 mol % and the molar ratio of the units (I) to the sum of the units (II)+(III) being between 0.95 and 1.05.

The units of the formula —O—R—O— are derived from substituted hydroquinone. Examples of substituted hydroquinones which may be mentioned are methyl-, ethyl-, chloro- or bromohydroquinone, and preferably methyl-hydroquinone.

The units of the formula —O—$R_1$—O— are derived from unsubstituted hydroquinone.

a and b preferably satisfy the equations: $0.5 \leq a \leq 1$ and $0 \leq b \leq 0.5$, and the molar ratio of the units (I) to the sum of the units (II)+(III) is equal to 1.

Furthermore, if the proportion of unsubstituted hydroquinone units is a maximum (this being the case where b is close to 0.7), the proportion of the units (III), relative to the sum of the units (II)+(III), is preferably not too large. In general, it should not be more than 50 mol % or 60 mol % in this case.

The units of the formula

are derived from phosgene or from a diaryl carbonate of the formula:

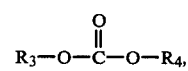

in which $R_3$ and $R_4$ represent monovalent aromatic hydrocarbon groups possessing 6 to 12 carbon atoms, such as ditolyl carbonate, phenyl tolyl carbonate, dinaphthyl carbonate and, preferably, diphenyl carbonate.

The units —CO—$R_2$—O— are derived from a dichloride or diaryl diester which is derived from an aromatic or cycloaliphatic dicarboxylic acid and has the general formula: Cl—CO—$R_2$—CO—Cl or $R_5$—OO-C—$R_2$—COO—$R_6$, in which formulae $R_2$ represents a divalent radical such as those defined above and $R_5$ and $R_6$ represent identical hydrocarbon groups to $R_3$ and $R_4$.

Amongst the dichlorides or diaryl diesters which may be used, those derived from the following acids may be mentioned: terephthalic acid, cyclohexane-1,4-dicarbocylic acid, biphenyl-4,4'-dicarboxylic acid, naphthalene-2,6-dicarboxylic acid, 4,4'-ethylenedioxydibenzene-1,1'-dicarboxylic acid, 4,4'-butylenedioxydibenzene-1,1'-dicarboxylic acid and 4,4'-hexylenedioxydibenzene-1,1'-dicarboxylic acid. In the case of the diesters, the diphenyl diesters are preferably used.

It must be understood that the units (III) can also be derived from a mixture of two or more than two dichlorides or diaryl diesters belonging to the group of compounds referred to above.

The copolyesters according to the present invention possess a high molecular weight and an inherent viscosity of more than 0.3 dlg$^{-1}$ (measured in a 50/50 solvent mixture of p-chlorophenol and 1,2-dichloroethane on a solution having a concentration of 0.5 g/100 cm$^3$, at 25° C.). More generally, they possess an inherent viscosity of more than 0.5 dlg$^{-1}$, and sometimes even more than 1 dlg$^{-1}$, in this same solvent mixture.

They possess a flow point of between 150° C. and 330° C. and more generally between 190° C. and 280° C.

The term flow point is understood as meaning the temperature at which the edges of a sample in the form of a polymer chip or chopped fiber start to become rounded. This temperature is determined by visual observation of the sample on a cover glass placed between crossed polarities (90° C.) for a suitable rate of temperature increase which is generally of the order of 10° to 20° C. per minute, on a microscope, equipped with a heating stage, which is known commercially by the trademark "Thermopan" and manufactured by REICHERT.

The copolyesters according to the present invention possess the important characteristic of being thermotropic, that is to say that they are capable of forming anisotropic melts which are easy to shape by extrusion, film formation or molding. Thermotropy is easy to demonstrate when observing the polymer in the molten state in optical systems equipped with crossed polarisers; the polarised light is transmitted and a strong birefringence is created, whereas the transmission of the light and the birefringence are zero for isotropic products observed under polarised light. The anisotropy of the polyesters according to the present invention was demonstrated by the TOT thermo-optical method described in French Application No. 2,270,282, published on Dec. 5, 1975.

Thus, melts in the anisotropic state possess a natural orientation and a relatively high degree of organization which are found again in the shaped articles, such as filaments, films and molded articles, and which impart to these articles (even in the crude state) improved properties, such as modulus and tensile strength, which are not usually observed in isotropic crude products.

The polycarbonates known hitherto have frequently been quoted for their excellent heat resistance; on the other hand, the shaping of these polycarbonates presented problems because of their high melt viscosity and their high conversion temperature.

The use of the anisotropic carbonate polyesters according to the present invention, in the molten state, makes is possible to combine good heat resistance with ease of shaping, by virtue of the totally exceptional rheological properties of thermotropic polymers (low apparent viscosity within certain ranges of velocity gradient).

Furthermore, the shaping of these carbonate polyesters within the rage of temperature at which they are thermotropic makes it possible to obtain filaments and films which have good mechanical properties immediately after extrusion and film formation, as well as molded articles which have very good mechanical characteristics of flexion and tensile strength, these properties improving when the thickness of the molded article is reduced.

However, before the shaping operation, the carbonate copolyesters according to the invention are preferably dried.

It is possible further to improve the mechanical properties of thin articles by means of a heat treatment at an elevated temperature which is below the flow point of the polymer.

The carbonate polyesters according to the present invention may be obtained by various known processes, for example by reacting an acid dichloride or a mixture of acid chloride, phosgene and a diphenol or a mixture of diphenols, in solution or by interfacial polycondensation in accordance with the method described in the "Encyclopaedia of Polymer Science and Technology" (1969, Volume 10, page 726).

However, they are preferably obtained by means of an exchange and polycondensation reaction using, as the starting materials, a diaryl carbonate (preferably diphenyl carbonate), a diaryl diester or a mixture of diaryl diesters with one another (preferably diphenyl diesters), and a substituted hydroquinone by itself or mixed with unsubstituted hydroquinone.

In both these processes, the reactants are used in proportions which are such that the molar ratio of the units (I) to the sum of the units (II)+(III) is between 0.95 and 1.05 and such that the amount of the units (II) in the mixture (II)+(III) is between 30 and 90 mol %. In other words, this means that the molar ratios: diphenol (or mixtures of diphenols)/diacid dichloride(s)+phosgene, on the one hand, and diphenol (or mixture of diphenols)/diaryl diester(s)+diaryl carbonate, on the other hand, are between 0.95 and 1.05. This also means that the proportions of phosgene, on the one hand, and diaryl carbonate, on the other hand, in the respective mixtures: phosgene+diacid dichloride(s) and diaryl carbonate+diaryl diester(s), are between 30 and 90 mol %.

When the exchange and polycondensation reaction is employed, the starting reactants may be brought into contact with one another simultaneously or successively, in a suitable order, in the presence of any per se known exchange and polycondensation catalysts, in the molten state.

Amongst the catalyst which may be used for carrying out the present invention in accordance with the exchange and polycondensation process, compounds given in the review "Encyclopaedia of Polymer Science and Technology" (1969, Volume 10, pages 722 and 723) may be mentioned, such as: lithium, sodium, potassium, magnesium, calcium, titanim, manganese, cobalt, zinc, tin, antimony, lanthanum, cerium, lead, and germanium, for example in the form of an oxide, hydride, hydroxide, halide, alcoholate, or phenolate or in the form of salts of organic or mineral acids, complex salts, or mixed salts. Magnesium acetate or manganese acetate is more particularly used. The amount of catalyst required is between 0.005 and 1 mol %, preferably 0.01 and 0.2 mol %, relative to the total amount of the components carbonate+diester(s).

The exchange and polycondensation reaction starts at a temperature above 180° C. and generally above 200° C. It may be carried out in 1 or 2 stages. When the reaction is carried out in two stages, the diaryl carbonate is first reacted with the substituted hydroquinone, which is optionally mixed with unsubstituted hydroquinone in the proportions given above, preferably in the presence of manganese acetate. The diaryl diester or diesters are then added. The reaction is carried out at a temperature above 200° C., preferably between 280° and 300° C., and is ended with a reduced pressure stage in order to facilitate the increase in the molecular weight of the copolyester by removal of the byproduct formed.

In certain cases, it may be desirable to increase the molecular weight of the resulting copolyester by means of post-condensation in the molten state, generally under a high vacuum, or by means of post-condensation in the solid state, generally with the circulation of an inert gas (nitrogen, $CO_2$ or argon). It is also possible to add heat stabilizers, such as phosphorus derivatives, at any stage of the polycondensation or during shaping.

The following examples, in which the parts are to be understood as parts by weight, are given by way of indication, but without implying a limitation, in order to illustrate the invention. In these examples, unless otherwise stated, the inherent viscosity measurements are carried out on a solution containing 0.5 g of polymer in 100 cm$^3$ of a 50/50 by volume mixture of para-chlorophenol and 1,2-dichloroethane.

EXAMPLE 1

445.2 parts of diphenyl terephthalate, 128.4 parts of diphenyl carbonate (30 mol %, relative to the sum of terephthalate+carbonate), 248 parts of methylhydroquinone, and 0.376 part of magnesium acetate are introduced into a stirred and heated polycondensation reactor equipped with a device for distillation and for sweeping with an inert gas.

The reactor is purged with nitrogen and then heated by means of a metal bath regulated at 250° C. When the temperature of the reaction mixture reaches 230° C., the phenol starts to distil. After 3 hours 15 minutes, 309.6 parts of phenol (82.3% of theory) are collected. The temperature of the metal bath is raised to 310° C. and the temperature of the reaction mixture increases from 230° to 310° C.; the pressure is then reduced from 760 mm Hg to 2 mm Hg in the course of 35 minutes, whilst the temperature of the bath and the mixture rises to 340° C.

The polycondensation is carried out in the course of 30 minutes at a temperature between 330° and 340° C. under a pressure of 2 mm Hg.

The polymer is extracted from the reactor. A total of 370 parts of phenol (98.4% of theory) were collected. The polymer obtained is beige and can be converted to fibers. It possesses an inherent viscosity of 2.15 dlg$^{-1}$, measured in the manner indicated above, and a flow point of 275°-280° C.

Characteristics

This polyester is anisotropic up to a temperature above 350° C.

Deflection temperature under load (ISO Standard Specification—Method A): 97°-99° C.

Second order glass transition temperature using a torsion pendulum: 93° C.

Torsional modulus as a function of the temperature:

| T°C. | 25° | 60° | 80° | 90° | 100° | 110° | 120° | 140° | 180° | 220° | 260° | 300° |
|---|---|---|---|---|---|---|---|---|---|---|---|---|
| Torsional modulus in daN/mm$^2$ | 110 | 105 | 102 | 95 | 65 | 45 | 38 | 30 | 22 | 14 | 8.5 | 2.8 |

Thermogravimetric analysis carried out with a temperature increase of 10° C./minute:

| Loss in weight | | 1% | 2% | 5% |
|---|---|---|---|---|
| Temperature | under air | 381° C. | 405° C. | 443° C. |
| | under nitrogen | 386° C. | 423° C. | 455° C. |

| Temperature | | 500° C. | 600° C. | 700° C. | 800° C. | 900° C. |
|---|---|---|---|---|---|---|
| Loss in weight % | under air | 23 | 65 | 95.75 | 99 | — |
| | under nitrogen | 30.25 | 58.75 | 63.5 | 66.5 | 68 |

The above results show that the carbonate polyesters can be used up to elevated temperatures (400° C.) without exhibiting a substantial loss in weight under air or under nitrogen. Furthermore, the change in the torsional modulus as a function of the temperature shows that the properties remain constant, even above the second order glass transition temperature.

The copolyester thus obtained is ground and dried for 48 hours at 90° C. under a pressure of 400 mm Hg and then for 6 hours at 150° C. under a pressure of 1 mm Hg, and then injection-molded on a press known commercially by the trademark "KAP", under the following conditions:

| | |
|---|---|
| Temperature: | 350°-370° C. |
| Pressure: | 8 kg/cm$^2$ |
| Temperature of the Mold: | 50° C. |
| Molded Products: | A bars of dimensions 70 × 10 × 4 mm; B wide dumb-bells of thickness 2 mm |

The test-pieces A were subjected to a heat treatment under nitrogen (HT) under the following conditions:
 20° C. to 240° C. in the course of 30 minutes
 240° C. for 30 minutes
 240° C. to 260° C. in the course of 30 minutes
 270° C. for 30 minutes.

The test-pieces B (dumb-bells of thickness 2 mm) have the following tensile strength characteristics:

| | |
|---|---|
| Breaking stress daN/mm$^2$: | 7.43 |
| Elongation at break %: | 2.48 |
| Modulus of elasticity daN/mm$^2$: | 303 |

The test-pieces A and B have the following flexural characteristics:

| | | A | B |
|---|---|---|---|
| Inherent viscosity in dlg$^{-1}$: | initial | 2.29$^{(x)}$ | 2.15 |
| | before HT | 1.73-1.90$^{(x)}$ | 2.17-2.25 |
| | after HT | 2.28 | |
| Flexural strength in daN/mm$^2$: | before HT | 12 | 14.3 |
| | after HT | 9.5 | |

|  | | A | B |
|---|---|---|---|
| Flexural | before HT | 454 | 990 |
| modulus | after HT | 367 | |
| in daN/mm$^2$: | | | |

(x)Inherent viscosity measured at 50° C. on a solution containing 0.5 g/100 cm$^3$ in p-chlorophenol by itself.

EXAMPLE 2

42.8 parts of diphenyl carbonate (50 mol %, relative to the sum; carbonate+terephthalate), 49.6 parts of methylhydroquinone, and 0.2 parts of manganese acetate are introduced into an identical reactor to that in Example 1.

The apparatus is purged with nitrogen and then heated with a metal bath regulated at 260° C. When the temperature of the reaction mixture reaches 253° C., the phenol starts to distil; the temperature of the bath is then raised gradually to 285° C., which corresponds to a temperature of 274° C. in the mixture. 36.85 parts of phenol (98% of the theoretical amount) are distilled in the course of 2 hours 15 minutes.

63.6 parts of diphenyl terephthalate are then added to the melt. The temperature of the bath is gradually raised to 300° C.; the pressure is then reduced from 760 to 7 mm Hg in the course of 25 minutes and the polycondensation is carried out in the course of 1 hour 50 minutes at 298° C. under a pressure of 7 mm Hg. In this second stage, 28.65 parts of phenol (87.1% of the theoretical amount) were collected.

The copolyester obtained han an inherent viscosity of 0.38 dlg$^{-1}$. Part of this copolyester is post-condensed in the liquid phase at a temperature between 275° C. and 286° C., under a pressure of 0.2 mm Hg, for 2 hours. An anisotopic melt is obtained which, on flowing, which gives a polymer of inherent viscosity 0.95 dlg$^{-1}$, which can be converted to fibers.

This copolyester possesses a flow point of about 205° C. and is anisotropic up to a temperature above 360° C.

Thermogravimetric analysis:

| Loss in weight | | 1% | 2% | 3% |
|---|---|---|---|---|
| Temperature | Under air | 382° C. | 406° C. | 448° C. |
| | Under nitrogen | 419° C. | 429° C. | 455° C. |

| | Temperature | 500° C. | 600° C. | 700° C. | 800° C. |
|---|---|---|---|---|---|
| Loss in weight % | Under air | 42.6 | 68.6 | 93.5 | 99.75 |
| | Under nitrogen | 33.75 | 62 | 67.5 | 68.5 |

EXAMPLE 3

198.4 parts of methylhydroquinone, 171.2 parts of phenyl carbonate (50 mol %, relative to the sum: carbonate+terephthalate), 254.4 parts of diphenyl terephthalate, 0.31 part of magnesium acetate, and 0.31 part of antimony oxide are introduced into an identical reactor to that in Example 1.

The apparatus is purged with nitrogen and then heated with a metal bath regulated at 252° C. When the temperature of the reaction mixture reaches 220° C., the trans-esterification reaction commences and the phenol starts to distil. The temperature is then gradually raised to 286° C. in the course of 3 hours, after which time 70% of the theoretical amount of phenol has distilled.

The pressure is then reduced gradually from 760 to 5 mm Hg in the course of 30 minutes, whilst the temperature of the mixture is increased from 286° C. to 303° C. The polycondensation is carried out in the course of 20 minutes under a pressure of 2 mm Hg at a temperature between 303° and 307° C.

99% of the theoretical amount of phenol is collected.

The carbonate copolyester thus obtained possesses an inherent viscosity of 1.18 dlg$^{-1}$.

This polyester is molded in a press having the trademark "KAP", in a nitrogen atmosphere, in an unheated mold, under a pressure of 7 kg/cm$^2$ and at a temperature of 250° C., to give test-pieces of dimensions 4×8.4×80 mm, dumb-bells of dimensions 2×4.4×50 mm, and notched bars of dimensions 4×6×50 mm.

| Tensile Strength Characteristics of the Dumb-Bells: | |
|---|---|
| Breaking Stress daN/mm$^2$: | 5.5 |
| Elongation at Break %: | 0.63 |
| Modulus of Elasticity daN/mm$^2$: | 918 |

| Flexural Characteristics: | 4 mm Thick Test-Pieces | Dumb-Bells |
|---|---|---|
| Flexural Strength daN/mm$^2$: | 8.26 | 15.4 |
| Flexural Modulus: | 770 | 988 |

| Charpy Impact Strength (French Standard Specification T 51 035) of the Notched Bars: | |
|---|---|
| Resilience: | 1.59 dJcm$^{-2}$ |

EXAMPLES 4 TO 7

Further tests were carried out in an identical manner to that described in Example 1, but with the following proportions of carbonate units, relative to the sum of the terephthalate+carbonate units: 20%, 35%, 40% and 50%. The physical characteristics of the copolyesters obtained are summarized in the table below:

| Example | Carbonate units mol % | Flow point | η inh dlg$^{-1}$ |
|---|---|---|---|
| 4 | 20 | >350° C. | insoluble |
| 5 | 35 | 220° C. | 1.59 |
| 6 | 40 | 210–220° C. | 1.14 |
| 7 | 50 | 205° C. | 0.38 |

Example 4 is mentioned by way of comparison in order to show that a proportion of 20% of carbonate units is insufficient obtain copolyesters having a flow point below 330° C.

Furthermore, although it may exist potentially, the anisotropy of this copolymer could not be detected because of its excessively high flow point.

The copolyesters of Examples 5 to 7 are anisotropic up to a temperature above 350° C.

EXAMPLE 8

248 parts of methylhydroquinone, 342.2 parts of diphenyl carbonate (80 mol %, relative to the sum: carbonate+terephthalate), 127.2 parts of diphenyl terephthalate, and 0.308 part of antimony trioxide are introduced into a stirred and heated polycondensation reactor equipped with a device for distillation and for sweeping with an inert gas.

The apparatus is purged with nitrogen before being heated in a metal bath regulated at 260° C. When the mixture reaches 228° C., the phenol starts to distil. 250.7 parts of phenol (67.8% of the theoretical amount) are collected in the course of 1 hour 20 minutes, whilst the temperature of the reaction mixture is raised gradually to 288° C. The pressure is then reduced to about 3 mm Hg at 290° C. and the polycondensation is then carried out for 40 minutes, in vacuo, at 290°–300° C.

A polymer having an inherent viscosity of 1.22 dlg$^{-1}$ and a flow point of 238° C., which can be converted to fibers, is collected. This polymer is ground and dried for 24 hours at 100° C. under a pressure of 400 mm Hg and then for 6 hours at 150° C. under a pressure of 1 mm Hg. It is then injection-molded on a press known commercially by the trademark KAP, at 257° C. (pressure 8 kg/cm$^2$), the mold being kept at about 250° C. The following properties are measured:

| Tensile Strength Properties (of Molded Articles in the Form of Dumb-Bells of Thickness 2 mm): | |
| --- | --- |
| Breaking Stress: | 8.05 daN/mm$^2$ |
| Elongation: | 0.52% |
| Modulus of Elasticity: | 623 daN/mm$^2$ |
| Flexural Properties (of Bars of Dimensions 80 × 8.4 × 4 mm): | |
| Flexural Strength: | 16.3 daN/mm$^2$ |
| Flexural Modulus: | 563 daN/mm$^2$ |
| Charpy Impact Strength (DIN Standard Specification 53 453) on Notched Bars): | |
| Resilience: | 12.5 dJcm$^{-2}$ |

EXAMPLES 9 TO 11

The process is carried out under exactly the same conditions as those described in Example 8, but the molar proportion of the carbonates is changed to 70%, 85% and 90%, respectively, relative to the sum: terephthalate+carbonate. The characteristics of the copolyester are as follows:

| EXAMPLE | Carbonate units % | Flow point | η inh dlg$^{-1}$ | Anisotrophy |
| --- | --- | --- | --- | --- |
| 8 | 80 | 238° C. | 1.22 | up to a temperature above 350° C. |
| 9 | 70 | 190° C. | 1.10 | up to a temperature above 350° C. |
| 10 | 85 | 250° C. | 0.68 | up to 280° C. |
| 11 | 90 | 260° C. | 0.77 | up to 268° C. |

EXAMPLE 12

A copolyester is prepared in the manner indicated in Example 3 and has the same composition but possesses an inherent viscosity of 2.28 dlg$^{-1}$.

The polymer was extruded in the molten state, at 340° C., through a spinneret possessing 6 orifices of diameter 0.23 mm, the said spinneret being kept at a temperature of 345° C.

The filament obtained possesses the following characteristics immediately after extrusion:

| Overall Gauge: | 65 dtex/6 strands |
| --- | --- |
| Tensile Strength: | 9.4 g/tex |
| Elongation: | 0.47% |
| Young's Modulus: | 1292 g/tex |
| Inherent Viscosity of the Filament: | 1.81 dlg$^{-1}$ |

EXAMPLE 13

A copolyester is prepared which has an identical composition to the copolyester of Example 2 but has an inherent viscosity of 2 dlg$^{-1}$, and it is extruded in the molten state, at a temperature of 320° C., through a spinneret having 6 orifices of diameter 0.23 mm, which is kept at 305° C. The filaments obtained having the following properties:

| Overall Gauge: | 84 dtex/6 strands |
| --- | --- |
| Tensile Strength: | 18.1 g/tex |
| Elongation: | 1.06% |
| Young's Modulus: | 1699 g/tex |
| Inherent Viscosity of the Filament: | 1.55 dlg$^{-1}$ |

EXAMPLE 14

By way of comparison with Example 2, the methylhydroquinone is replaced by an equivalent proportion of unsubstituted hydroquinone. The proportion of carbonate units is 50 mol %, relative to the sum of the carbonate+terephthalate units.

10.7 parts of diphenyl carbonate, 11 parts of hydroquinone and 0.1 part of manganese acetate are introduced into a 150 cm$^3$ polycondensation tube.

The apparatus is purged with nitrogen and the tube is heated with a metal bath regulated at 260° C.; when the temperature of the mixture reaches about 240° C., the phenol starts to distil; 7.5 parts of phenol are distilled in the course of 20 minutes, whilst the temperature is raised to 262° C.

15.9 parts of diphenyl terephthalate are then introduced. The phenol starts to distil again when the temperature of the mixture reaches 273° C. A further 8.5 parts of phenol are distilled inthe course of 2 hours 55 minutes, whilst the temperature of the mixture is increased to 380° C. However, after 2 hours 30 minutes starting from 280° C., the mixture has solidified. The pressure is reduced from 760 to 0.5 mm Hg in the course of 10 minutes and the reaction is ended by carrying out a post-condensation at 320°–330° C. under a pressure of 0.5 mm Hg, in the solid phase, for 2 hours 10 minutes.

This yields a polymer which is insoluble in the solvent used above, has a melting point above 350° C. and is not suitable within the scope of the invention. It cannot be shaped within a temperature range normally used for shaping.

EXAMPLE 15

By way of comparison with Example 8, the methylhydroquinone is replaced by an equivalent proportion of unsubstituted hydroquinone. The proportion of carbonate units is 80 mol %, relative to the sum: carbonate+terephthalate.

220.2 parts of diphenyl carbonate, 342.7 parts of hydroquinone, 127.3 parts of diphenyl terephthalate, and 0.345 part of magnesium acetate are introduced into a stirred and heated polycondensation reactor equipped with a device for stirring and for sweeping with an inert gas.

The apparatus is purged with nitrogen and the tube is heated with a metal bath regulated at 240° C.; when the temperature of the mixture has reached about 216° C., the phenol starts to distil. The temperature of the mixture is gradually raised to 270° C. in the course of 4 hours, after which time the mixture has become solid and friable.

The temperature is raised to 340°-350° C. in the course of two hours without being able to remelt the mixture. The pressure is then reduced from 760 to 0.8 mm Hg and this solid mixture is polycondensed at 340°-350° C. for 1 hour 15 minutes. The beige powder obtained is insoluble in the solvent mixture used. The flow point is above 350° C.

In the TOT test, a flow point of between 370° and 390° C. is detected, the mixture being anisotropic up to a temperature above 430° C.

EXAMPLE 16

42.8 parts of diphenyl carbonate (50 mol %, relative to the sum: carbonate+terephthalate), 24.8 parts of methylhydroquinone (50 mol %, relative to the sum of the diphenols), 22 parts of hydroquinone (50 mol %), and 0.2 part of manganese acetate are introduced into a stirred and heated polycondensation reactor equipped with a device for stirring and for sweeping with an inert gas.

The process is carried out in the manner described in Example 2 in two stages, 63.6 parts of diphenyl terephthalate being added at the start of the second stage and the reaction being ended under reduced pressure in the manner indicated in Example 2.

The copolyester thus obtained possesses the following characteristics:

| Flow Point: | 280° C. |
|---|---|
| Inherent Viscosity: | 1.43 dlg$^{-1}$ |
| Anisotropy Up to a Temperature Above: | 360° C. |

EXAMPLE 17

Example 16 is repeated using the following reactants: 42.8 parts of diphenyl carbonate (50 mol %, relative to the sum: carbonate+terephthalate), 29.76 parts of methylhydroquinone (60 mol %, relative to the sum of the diphenols), 17.6 parts of hydroquinone (40 mol %, relative to the sum of the diphenols), and 0.2 part of manganese acetate.

The process is carried out in two stages in the manner indicated in Example 2, 63.6 parts of diphenyl terephthalate being added at the start of the second stage and the polycondensation also being ended under pressure.

The copolyester thus obtained possesses the following characteristics:

| Flow Point: | 265° C. |
|---|---|
| Inherent Viscosity: | Insoluble |
| Anisotropy Up to a Temperature above: | 360° C. |

EXAMPLE 18

Example 16 is repeated using the following reactants: 42.8 parts of diphenyl carbonate (50 mol %, relative to the sum: carbonate+terephthalate), 34.72 parts of methylhydroquinone (70 mol %, relative to the sum of the diphenols), 13.2 parts of hydroquinone (30 mol %, relative to the sum of the diphenols), and 0.2 part of manganese acetate.

The process is carried out in two stages, 63.6 parts of diphenyl terephthalate being added in the second stage and the operation being ended in vacuo.

The copolyester obtained possesses the following characteristics:

| Flow Point: | 237° C. |
|---|---|
| Inherent Viscosity: | 1.18 dlg$^{-1}$ |
| Anisotropy Up to a Temperature above: | 350° C. |

The table below summarizes the characteristics of the copolyesters in which the proportion of unsubstituted hydroquinone, relative to the sum of the diphenols, varies from 0 to 100 mol % (the other diphenol being methyl-hydroquinone) and the proportion of diphenyl carbonate, relative to the sum: carbonate+terephthalate, is fixed at 50 mol %.

| EXAMPLE | Unsubstituted hydroquinone mol % | Flow point | η inh dlg$^{-1}$ | Anisotropy |
|---|---|---|---|---|
| 2 | 0 | 205° C. | 0.95 | up to a temperature above 360° C. |
| 18 | 30 | 237° C. | 1.18 | up to a temperature above 350° C. |
| 17 | 40 | 265° C. | insoluble | up to a temperature above 360° C. |
| 16 | 50 | 280° C. | 1.43 | up to a temperature above 360° C. |
| 14 | 100 | >360° C. | insoluble | not determined |

What is claimed is:

1. A thermotropic carbonate polyester of high molecular weight, which can be shaped, characterized in that it possesses an inherent viscosity of more than 0.3 dlg$^{-1}$ (measured on a solution containing 0.5 g of polymer in 100 cm$^3$ of a 50/50 by volume mixture of para-chlorophenol and 1,2-dichloroethane) and a flow point which is above or equal to 150° C. and below 330° C., and in that it consists essentially of units of the formulae:

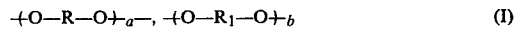

(I)

(II)

and

(III)

in which the radicals R, which are identical, each represent a para-phenylene radical which is monosubstituted by a methyl or ethyl group or a chlorine or bromine atom;

the radicals $R_1$ each represent an unsubstituted paraphenylene radical, with $0.3 \leq a \leq 1$, $0 \leq b \leq 0.7$ and $a+b=1$; and the radicals $R_2$, which may be identical or different, each represent a radical chosen from amongst para-phenylene, 1,4-cyclohexylene, 4,4'-biphenylene, 2,6-naphthylene, 1,1'(4,4'-ethylenedioxydiphenylene), 1,1'-(4,4'-butylenedioxydiphenylene) and 1,1'-(4,4-hexylenedioxydiphenylene) groups, the amount of the units (II) in the mixture (II)+(III) being between 30 and 90 mol % and the molar ratio of the units (I) to the sum of the units (II)+(III) being between 0.95 and 1.05.

2. A carbonate polyester according to claim 1, characterized in that the symbols a and b satisfy the equations: $0.5 \leq a \leq 1$ and $0 \leq b \leq 0.5$, in which $a+b=1$.

3. A carbonate polyester according to claim 1 or 2, characterized in that it possesses an inherent viscosity of more than 0.5 dlg$^{-1}$.

4. A carbonate polyester according to claim 1, 2 or 3, characterized in that it possesses a flow point of between 190° C. and 280° C.

5. A carbonate polyester according to claim 1, 2, 3 or 4, characterized in that the radical R is a para-phenylene radical which is monosubstituted by a methyl group.

6. A carbonate polyester according to claim 1, 2, 3, 4 or 5, characterized in that the radical $R_2$ is the para-phenylene radical.

7. A shaped article, such as a filament, a film or a molded article, produced from a carbonate polyester as defined in claim 1.

8. A process for the preparation of a carbonate polyester as defined in claim 1, characterized in that:

(α) the dichloride of terrephthalic acid, cyclohexane-1,4-dicarboxylic acid, biphenyl-4,4'-dicarboxylic acid, naphthalene-2,6-dicarboxylic acid, 4,4'-ethylene-dioxydibenzene-1,1'-dicarboxylic acid, 4,4'-butylenedioxydibenzene-1,1'-dicarboxylic acid or 4,4'-hexylenedioxydibenzene-1,1'-dicarboxylic acid, or a mixture of two or more than two of the above-mentioned dichlorides with one another, is reacted with (β) phosgene, and with (γ) methyl-, ethyl-, chloro- or bromo-hydroquinone, by itself or mixed with up to 70 mol % (relative to the sum of the diphenols) of unsubstituted hydroquinone, the molar ratio of diphenol (or mixture of diphenols) to the sum of acid dichloride(s)+phosgene being between 0.95 and 1.05, the amount of phosgene in the mixture of phosgene+diacid dichloride(s) being between 30 and 90 mol %, and the reaction being carried out in solution or by means of interfacial polycondensation.

9. A process for the preparation of a carbonate polyester as defined in claim 1, characterized in that:

(α) a diaryl ester of terephthalic acid, cyclohexane-1,4-dicarboxylic acid, biphenyl-4,4'-dicarboxylic acid, naphthalene-2,6-dicarboxylic acid, 4,4'-ethylene-dioxydibenzene-1,1'-dicarboxylic acid, 4,4'-butylenedioxy-dibenzene-1,1'-dicarboxylic acid or 4,4'-hexylenedioxy-dibenzene-1,1'-dicarboxylic acid, or a mixture of two or more than two of the above-mentioned diesters with one another, is reacted, at a temperature above 200° C., with (β) a diaryl dicarbonate, and with (γ) methyl-, ethyl-, chloro- or bromo-hydroquinone, by itself or mixed with up to 70 mol % (relative to the sum of the diphenols of unsubstituted hydroquinone, the molar ratio of diphenol (or mixture of diphenols) to the sum of diaryl diester(s)+diaryl carbonate being between 0.95 and 1.05, and the amount of diaryl carbonate in the mixture of diaryl carbonate+diaryl diester(s) being between 30 and 90 mol %.

10. A process according to claim 9, characterized in that the exchange reaction is carried out in two stages which comprise firstly the reaction of the diaryl carbonate with the substituted hydroquinone, which is optionally mixed with unsubstituted hydroquinone, then the addition of the diaryl diester(s) at a temperature above 200° C., and then the polycondensation of the resulting product, in the molten state, under reduced pressure.

* * * * *